United States Patent [19]

Sevcik

[11] Patent Number: 4,782,506
[45] Date of Patent: Nov. 1, 1988

[54] ARRANGEMENT FOR OPERATING AND MAINTAINING A TELECOMMUNICATIONS SYSTEM

[75] Inventor: Maximilian Sevcik, Mettmenstetten, Switzerland

[73] Assignee: Siemens-Albis Aktiengesellschaft, Zurich, Switzerland

[21] Appl. No.: 878,944

[22] Filed: Jun. 26, 1986

[30] Foreign Application Priority Data

Jul. 5, 1985 [CH] Switzerland ............... 02903/85

[51] Int. Cl.[4] .................. H04M 7/06; H04M 3/28
[52] U.S. Cl. ............................ 379/10; 379/14; 379/242; 379/284
[58] Field of Search ........... 379/201, 207, 113, 269, 379/284, 34, 10, 11, 229, 14, 9, 242

[56] References Cited

U.S. PATENT DOCUMENTS 4,653,085  3/1987  Chan et al. .................. 379/94
4,696,026  9/1987  Plouff ........................ 379/34

OTHER PUBLICATIONS

J. J. Bodnar et al., "SCC: Remote Control and Maintenance of Switching Offices", Bell Laboratories Record, Jul./Aug. 1974, pp. 207-211.
Standard Search Report, European Patent Office, file RS 73443 CH.
British Telecommunications Engineering, vol. 3, No. 4, Jan. 1985, pp. 277-284, London, GB; R. M. Baty et al.: "System X: Maintenance Control Subsystem".
1982 International Zurich Seminar on Digital Communications, 9.-11. Mar. 1982, Zurich, CH, pp. 269-275, IEEE, New York, U.S.; M. Benedetti et al.: "Toward a New Man-Machine Interaction in SPC Switching Systems".
IEEE Transactions on Communications, vol. COM-30, No. 6, Jun. 1982, pp. 1329-1336, IEEE, New York, U.S.; B. H. Hornbach: "MML: CCITT Man-Macnine Language".
Proceedings of the International Switching Symposium, 7.-11. May 1984, Telecommunication Switching, Florence, IT, "Session 33A, p. 5", pp. 1-6, North-Holland Publ. Co., Amsterdam, NL; F. Pagel et al.: "Chill Visibility and Separate Compilation Meet Databases-A Development Envelope for Large Chill Programs".
IEEE Global Telecommunications Conference, Conference Record, vol. 3, Nov. 29, 1982, Miami, FL, U.S., pp. E3.4.1-E3.4.5 (1013-1017), IEEE, New York, U.S.; H. Aoyagi et al.: "Interactive Data Generator for Centennial II PABX".

Primary Examiner—James L. Dwyer
Attorney, Agent, or Firm—Adel A. Ahmed

[57] ABSTRACT

An operation support system architecture for a telecommunication system contains a control arrangement (BWS) inserted between the system (S) to be operated and an opertor station (DSS). The control arrangmeent comprises, besides a processor and an input/output unit (EAB), a memory (RSP) which contains the operating and maintenance knowledge of the system (S), namely in the form of the CCITT Specification Language SDL/PR. Further the control arrangement (BWS) comprises a correlation memory (ZSP) in which are stored the definition for the formation of MML commands to the system (S) and the formal description of the reactions expected by the system (S). On the basis of the data in the two memories (RSP, ZSP), a translator (I), also present in the control arrangmeent (BWS), can send the correct and properly structured commands directly to the system (S) or respectively evaluate the reactions of the system (S). The arrangement makes possible a paperless operation and maintenance, which is largely independent of the type of system (S) connected and can easily be adapted to changing conditions.

4 Claims, 2 Drawing Sheets

ARRANGEMENT FOR OPERATING AND MAINTAINING A TELECOMMUNICATIONS SYSTEM

BACKGROUND OF THE INVENTION

1. Technical Field

The present invention relates to the field of operation support systems for a telecommunications exchange, which system provides centralized operation, administration and maintenance support for the exchange.

2. Description of the Prior Art

The operation and administration tasks in telecommunication networks relate essentially to reorganizing, changing and expanding system data, as for instance, the exchange, network, trunk group and subscriber connection data. It is important to be able to organize, modify or erase this data at any time during the operation of a system. The object of maintenance, on the other hand, is to maintain the functionality of a system by purposeful tests and to assure the operational quality of the exchange processes. The operating and maintenance personnel, therefore, must be able to communicate, via an operator station or man-machine interface, with the respective devices of the telecommunications system, where, for the dialogue with the operating and maintenance programs, particular operating procedures are given, as a rule, in an application-oriented command language (e.g. the so-called CCITT-MML or CCITT-Man Machine Language). The operation and maintenance can take place either for exchanges individually or on a centralized basis for several exchanges.

Arrangements known until now for the operation and maintenance of telecommunications systems require extensive documentation, reflected in a plurality of manuals. Their content consists as a rule of descriptions of the permitted commands to the system, of the permitted reactions of the system, and of the operating procedures. The latter establish how the individual operating and maintenance tasks, consisting of sequences or combinations of commands, must be organized with a simultaneous consideration of the system reactions. The care, i.e. the continuous updating of the documentation, may become very expensive, because, with every alteration in a system to be operated and maintained, a manual adaptation of the documentation becomes necessary, and the danger of introducing errors into the process becomes quite great.

SUMMARY OF THE INVENTION

It is an object of the present invention to state a solution for the operation and maintenance of stored program controlled telecommunications systems which is employable generally, i.e. as nearly independent as possible of the type of system, and which permits easy adaptation to changing conditions. In accordance with an aspect of the invention, an arrangement for the preparation of operating and maintenance procedures for at least one stored program controlled telecommunications system, more particularly, a telephone exchange system, where the operator can transmit the desired procedures via an operator station to the control apparatus of the telecommunications system and corresponding reactions of the telecommunications system are transmitted to the operator station, includes a control arrangement inserted between the operator station and the telecommunications system. The control arrangement comprises an input/output unit forming the interface to the operator station and to the telecommunications system, and a processor. The control arrangement further comprises a memory in which all operating and maintenance procedures of the telecommunication system, being represented in accordance with a procedural version of a specification and description language (SDL/PR), are stored. The control arrangement has access to a correlation memory in which is stored, for all SDL/PR output signals, the structure—defined in a formal representation—of the commands corresponding to these signals and to be given to the telecommunication system or to the operator station. In the correlation memory, there are stored further, for all reactions originating from the operator station or from the telecommunication system, the SDL/PR input signals corresponding to the reactions and converted into the formal representation. The control arrangement further comprises a translator which interprets the reactions originating from the telecommunication system or from the operator station and converts them to the formal representation and generates therefrom the corresponding SDL/PR input signal based on the data in the correlation memory. The translator correlates to the SDL/PR output signals to be given to the telecommunication system or to the operator station, on the basis of the data in the correlation memory, the respective formal command, then converting the command to a form suitable for delivery to the operator station or to the telecommunication system.

The invention proceeds from the specification language SDL/PR known in itself and uses it to update operating and maintenance knowledge of a telecommunications system normally contained in voluminous manuals. SDL (Specification and Description Language) was introduced some years ago by CCITT. This communication-oriented language further proceeds from the model concept of a number of simultaneously occurring processes which communicate with one another and with the environment by signals. The behavior of a process is determined by its states. An incoming signal can trigger a transition from an existing to a new state, signals being emitted as needed. The basic idea is essentially that of a finite automaton which can run through different states. An SDL process is an object which is either in a waiting state or in a transition. In the waiting state, it waits for an input signal. In the transition, as a result of an input signal, a series of activities takes place, to get from one state to another. For further details on this language, reference is made to "IEEE Transaction on Communications" Vol. COM-30, No. 6, June 1982, pages 1310 to 1317. In the Detailed Description, the invention will be explained more specifically with reference to drawings, FIGS. 1-3.

DETAILED DESCRIPTION

Figure 1:
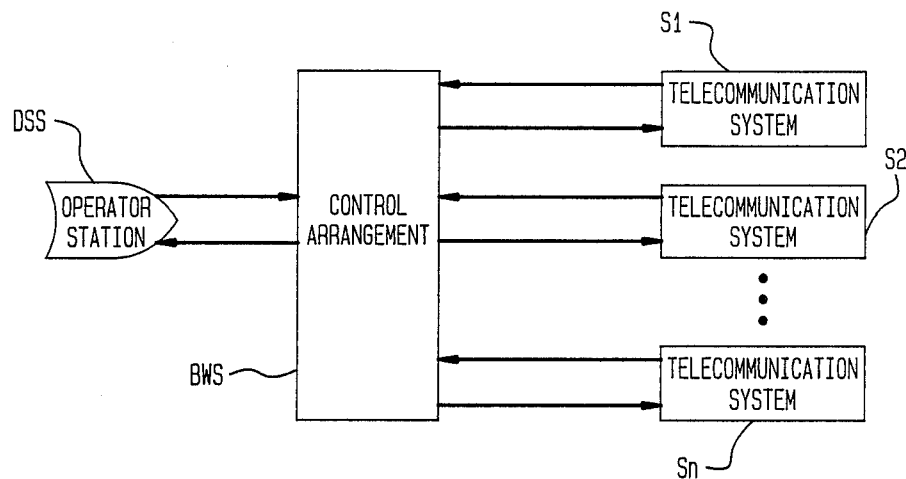
FIG. 1 shows a basic representation of the arrangement according to the invention.

FIG. 1 shows an operator station DSS equipped, for example, with a data display, from which various telecommunication systems S1, S2 . . . Sn differing with respect to the sequences for operation and maintenance can be acted upon for the purpose of operation and maintenance. Between the operator station DSS and the systems S1-Sn the invention provides for the insertion of a control arrangement BWS. From the operator station DSS, it is possible by input of appropriate commands to initiate the desired operating and maintenance procedures in one of the connected systems S1-Sn and to control their progress. Reactions caused thereby in the systems S1-Sn go to the control arrangement BWS and, if necessary, as requests to the operator station DSS. For the commands sent from the operator to the control arrangement BWS as well as for the operating requests arriving at the operator station DSS from the control arrangement BWS, preferably the language MML (Man Machine Language) standardized by the CCITT is used. Likewise CCITT-MML is preferably used both for the commands transmitted from the control arrangement BWS to the systems S1-Sn and for the system reactions going in the opposite direction from systems S1-Sn to the control arrangement BWS.

Figure 2:
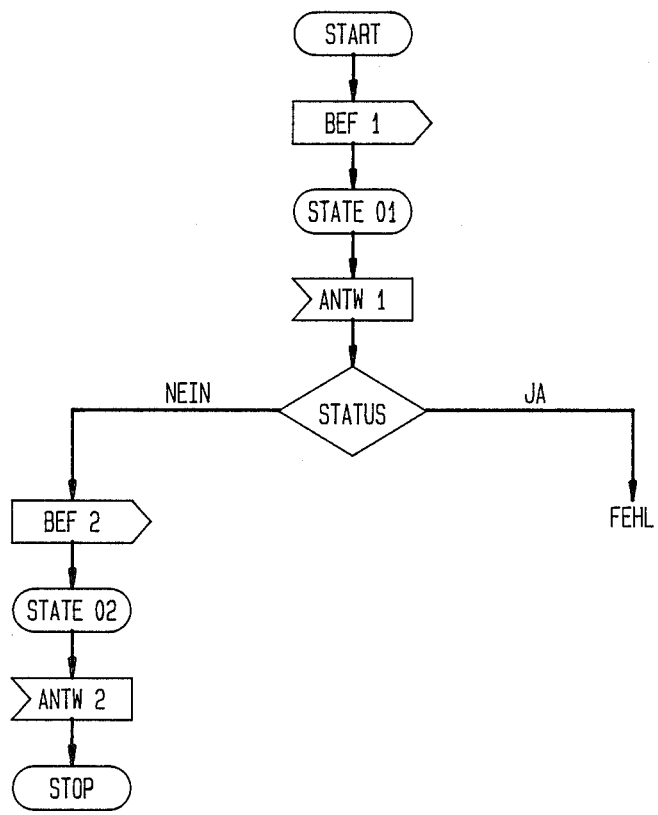
FIG. 2 provides details of this arrangement.

FIG. 2 shows details regarding the concept of the control arrangement BWS inserted between the operator station DSS and one or more exchanges S1 . . . Sn. The control arrangement BWS comprises a processor not shown in the drawing, which takes over the control of all procedures described in the following. Besides the processor, the control arrangement BWS contains an I/O unit EAB forming the interface between the operator station DSS and the system S. Cooperating with the processor, this interface assumes also the control of the function at the operator station DSS. In addition the control arrangement BWS contains a translator I as well as a memory RSP, in which the "knowledge" necessary for operation and maintenance of one or more connected systems S is stored in the form of the above-mentioned SDL specification language, namely the so-called procedural version SDL/PR. All operating and maintenance procedures, i.e. sequences of CCITT-MML commands and reactions, are represented according to the rules of CCITT-SDL/PR in processes by 'states' and 'transitions' and deposited in the memory RSP. All commands and reactions within these procedures are regarded as SDL signals. The memory RSP thus contains the run-down of all procedures callable in the course of operation and maintenance which enable the operator to make the desired interventions in a particular connected system S, and this without having to use an operating or maintenance manual in which the various steps are set down. Thus "paperless" operation and maintenance of the connected system S is possible. The control arrangement BWS has access to a correlation memory ZSP, whose function will be discussed below. This correlation memory ZSP is contained in the control arrangement BWS.

The basic events in the operation and maintenance with this arrangement will now be explained. On the one hand, the commands given within a procedure to the connected system S or to the operator station DSS (operator requests) and, on the other hand, the reactions given by the system S and by the operator station DSS (operator answers) are regarded as signals in the sense of the CCITT description language SDL/PR. In the following, the former will be referred to also as SDL output signals, the latter as SDL input signals.

When as a result of an input at the operator station DSS or due to an automatically occurring procedural step—triggered for example by the timing-out of a timing element—the processor of the control arrangement BWS receives from the memory RSP the instruction to cause the delivery of a SDL output signal, i.e. of a certain command, to the system S, this command is converted on the basis of data in the correlation memory ZSP by the translator I in a processing phase Z2 into a formal representation containing all instructions that are necessary for the execution of the respective MML command in the respective system S. In the correlation memory ZSP all possible SDL output signals are defined; i.e. for each SDL output signal, the structure of the respective MML command is established in a formal representation with the parameters and value ranges required for the performance of the procedures corresponding to this SDL output signal in the system S.

Following the CCITT-MML rules, the structure of a MML command may, for example, look as follows:

EINRICHTEN LEITUNG:LTGNR=10,
      SIGART=MFC;

The command head consists of the activity 'EINRICHTEN' (SET UP) and the object 'LEITUNG' (LINE). The values '10' and 'MFC' are the values of the two parameters relevant in the present case, namely, 'line or trunk group number' LTGNR and 'signaling method' SIGART, which they can assume within given value ranges. Normally the value ranges are different for different commands and parameters. The structure of the MML commands as well as of their parameters and value ranges depends on the type of telecommunication system connected.

Further the correlation memory ZSP contains also the definitions that are necessary in order conversely to convert all reactions given by the connected systems S or by the operator station DSS into the respective SDL input signal. Together with the content of the memory RSP, therefore, the formal description of all commands and reactions in the correlation memory ZSP forms the entire "knowledge" necessary for the performance of the operating and maintenance procedures in the connected system S. Especially advantageous is the fact that the contents of the memory RSP and of the correlation memory ZSP are easily updatable. All these changes and adaptations can be carried out through an editor ED. It is thus possible in an especially advantageous manner to achieve a largely system-independent operation and maintenance, i.e. one applicable generally to exchanges that are quite different with respect to operation and maintenance, e.g. for all systems operating according to the rules of CCITT-MML.

Now as soon as the command to be given to the system S according to the above assumption is specified on the basis of the data in the correlation memory ZSP, it is processed by the translator I in a processing phase U2, if necessary supplemented with the missing parameters, tested, and then converted to the MML form and supplied to the system S, where consequently the respective steps are triggered. In the same manner also an SDL output signal containing a request to the operator station, DSS e.g. as a result of a reaction of the system S, is treated and finally transmitted to the operator station DSS, where it is made visible in a representation intelligible to the operator (characters, graph, etc.).

A further instruction in the memory RSP may consist in waiting for an SDL input signal, for example, a reaction from the system S required as a result of the previously transmitted MML command. When this reaction arrives from the system S in MML form, it is converted by the translator I in a processing phase U1 into the formal representation, from which thereafter, in a further processing phase Z1, an SDL input signal with all data which the reaction contains can be correlated to it on the basis of the definitions in the correlation memory ZSP. The processor can then also determine on the basis of this SDL input signal what type of reaction is involved and can continue with the further working up of the instructions in memory RSP accordingly. In the same manner reactions of the operator may also be treated.

The tasks of the translator I may be summarized briefly as follows:

A reaction in MML originating from the system S or from the operator station DSS is converted in a first processing phase U1 into the formal representation, and, by means of the definitions in the correlation memory ZSP, the respective SDL input signal is correlated to the reaction. To a command to be given to the system S or to the operator station DSS, the respective formal representation is correlated in a processing phase Z2, again with the aid of the definitions in the correlation memory ZSP, which representation is then converted to MML in the following processing phase U2, possibly supplemented, tested, and supplied to the system S or respectively to the operator station DSS. Naturally a language other than MML is also conceivable for the communication between the operator and the system S; in that case it suffices to adapt the respective processing phases U1, U2, in which the conversion takes place, to the particular situation. The formal definitions of the commands in the correlation memory ZSP establish the rules for the formation of MML commands to the connected systems S; e.g. the parameters of a command and their arrangement inside the command. In analogy thereto, also the structure of the reactions expected by the system S is formally described in the correlation memory ZSP. Additional components of the SDL model, such as Tasks, Decision, etc., assume the function, assigned to them by CCITT, of controlling the run-down of operating and maintenance procedures.

Figure 3:
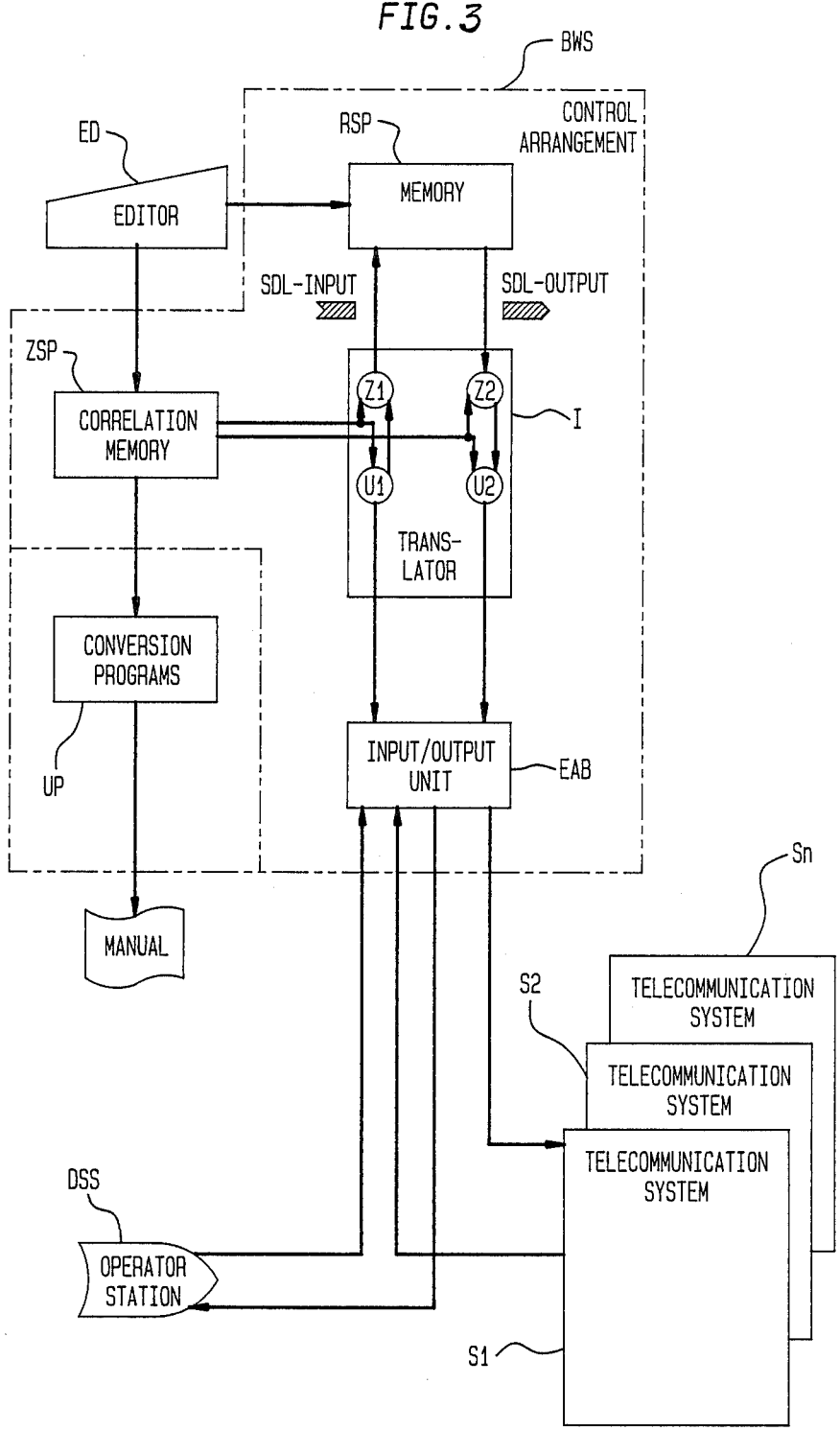
FIG. 3 shows the representation of a simple operating procedure.

An example will illustrate the above statements. Underlying the example is a simplified operation procedure designated "Set up Line", the run-down of which is shown in FIG. 3 and which can be paraphrased in clear text as follows:

For the system to be operated, a procedure "Set up Line" is to be initiated. The first command BEF1 "Line Present?" of this procedure serves to test whether a similar line is already present or not. After input of the command, therefore, a corresponding answer must be awaited. This occurs in the waiting state STATE 01. If the parameter STATUS of the arriving answer ANTW1 is positive, i.e. the desired line is already organized, a fault is recognized and the operator's attention is called to it by a notice FAULT to that effect at the operator station. But if the parameter STATUS of the answer ANTW1 is negative, there follows the command BEF2 "Set up Line", which contains the actual setting up of the desired line. As soon as the line is set up, the answer ANTW2 is given and with respective signaling to the operator station that the procedure is finished.

The representation of the simplified operating procedure "Set Up Line" in the memory RSP may look as follows in SDL/PR representation:

(The remarks placed between the * symbols do not belong to the stored procedure, but serve only for explanation.)

| | |
|---|---|
| Process LTGEINRICHTEN;<br>Signalset ANTW1, . . . ,<br>Start; | *Setting up of a line* |
| Output BEF1 (LTGNR:=line number); | *Test whether line with the designated line number already exists; i.e. the line data must be interrogated with a command BEF1 in the connected system* |
| State State01: | *Await answer of system* |
| Input ANTW1 (STATUS); | *Determine the value of the parameter |
| Decision (STATUS) | STATUS (YES, NO) * |
| (YES): Output FEHL ( . . . ); Stop; | *Line already exists, i.e. fault signal at operator station* |
| (NO): Output BEF2 (LTGNR:=Line number,<br>    LTGART:=Type,<br>    SIGART:=Signaling method, etc.);<br>State State02; | * Line not yet present, it can be set up with a command BEF2 to the connected system*<br>*Await answer of the system, process data of the answer, etc.* |
| Input ANTW2, . . .<br>End decision;<br>End process; | *Line is set up* |

The formal representation of a part of the definitions in the correlation memory ZSP necessary for the operating procedure "Set Up Line" looks as follows:

| | |
|---|---|
| def wb1(line number, 1 . . . 255) | *Definition of the value ranges* |
| def wb2(signaling-method,MFC, IW etc.)<br>def wb3(type, INCOMING, OUTGOING) | |
| def BEF1(seq LTGNR (line number)) | *Definition of the command for interrogation whether line with designated number is already present. The command consists of a single parameter LTGNR* |
| def BEF2(seg LTGNR (line number), | *Definition of the command |

| | |
|---|---|
| LTGART (Type), SIGART (signaling method)); | for setup of a line. The command consists of a sequence of the parameters LTGNR, LTGART, SIGART with the respective value ranges for line number, line type and signaling method* |
| def ANTW1(seq STATUS (state)); | *Definition of the answer to the command "line already present?" The answer consists of a single parameter STATUS with value range state.° |
| etc. | |

The control arrangement BWS shown in FIG. 2 can be realized in a simple manner in a small computer, such as a so-called personal computer, where the two memories ZSP, RSP are contained in the computer. This makes the "operating and maintenance knowledge" portable and hence interpretable on different computers. It can easily be adapted by the user of an exchange to the particular needs, in that he can establish the operating and maintenance procedures required in the instance according to the rules of CCITT-SDL/PR and determine the content of the correlation memory ZSP accordingly. It is conceivable also to retain the procedures of telecommunications systems differing from one another as to operation and maintenance in one and the same computer and to operate or maintain these systems from a single operator station without manuals.

Use of the arrangement according to the invention is not limited to the case of "paperless" operation and maintenance of telecommunications systems. The operating and maintenance data contained in the control arrangement BWS (content of the correlation memory ZSP and of the memory RSP) can be made use of also for the generation of operating and maintenance documents in the form of manuals HB, in that they are automatically converted by computer control by means of a conversion program UP into a representation intelligible to the operator and published on paper via a printer. By the use of appropriate conversion programs UP, it is also readily possible to generate versions in different languages. It is also thereby ensured that, if necessary, conventional operation and maintenance with manuals is possible. The control arrangement BWS can be realized in various computers, in that the translator I and the I/O unit EAB are adapted accordingly, without having to change the operating and maintenance knowledge once stored in the memories ZSP, RSP. Thus there has been shown and described a system architecture for an operation support system which fulfills all the advantages sought, only limited in scope by the claims which follow.

What is claimed is:

1. An arrangement for the preparation of operating and maintenance procedures for at least one stored program controlled telecommunications system, more particularly, a telephone exchange system, where the operator can transmit the desired procedures via an operator station to the control apparatus of the telecommunications system and corresponding reactions of the telecommunications system are transmitted to the operator station, characterized in that there is inserted between the operator station (DSS) and the telecommunications system (S) a control arrangement (BWS) comprising an input/output unit (EAB) forming the interface to the operator station (DSS) and to the telecommunications system (S), and a processor, which control arrangement (BWS) further comprises a memory (RSP) in which all operating and maintenance procedures of the telecommunication system (S), being represented in accordance with a procedural version of a specification and description language (SDL/PR), are stored; that the control arrangement (BWS) has access to a correlation memory (ZSP) in which is stored, for all SDL/PR output signals, the structure—defined in a formal representation—of the commands corresponding to these signals and to be given to the telecommunication system (S) or to the operator station (DSS); that in the correlation memory (ZSP), there are stored further, for all reactions originating from the operator station (DSS) or from the telecommunication system (S), the SDL/PR input signals corresponding to the reactions and converted into said formal representation, that the control arrangement (BWS) further comprises a translator (I) which interprets the reactions originating from the telecommunication system (S) or from the operator station (DSS) and converts them to the formal representation and generates therefrom the corresponding SDL/PR input signal based on the data in the correlation memory (ZSP); and that the translator (I) correlates to the SDL/PR output signals to be given to the telecommunication system (S) or to the operator station (DSS), on the basis of the data in the correlation memory (ZSP), the respective formal command, then converting the command to a form suitable for delivery to the operator station (DSS) or to the telecommunication system (S).

2. The arrangement according to claim 1, further characterized in that the translator (I) converts the formal representation of the commands into MML commands for the telecommunication system (S) or converts the MML reactions of the telecommunication system (S) into the formal representation.

3. The arrangement according to claim 2, further characterized in that the control arrangement (BWS) with the memory (RSP) and the correlation memory (ZSP) is realized in a personal computer, the two said memories (RSP, ZSP) being freely programmable by the operator with the aid of a formal language.

4. The arrangement according to claim 2, further characterized in that the control arrangement (BWS) has access to a converter program (UP) which converts data contained in the two said memories (RSP, ZSP) into a representation which permits the automatic production of manuals (HB) containing the respective operating and maintenance procedures.

* * * * *